(12) United States Patent
Satou (10) Patent No.: US 8,721,891 B2
(45) Date of Patent: May 13, 2014

(54) ZEOLITE MEMBRANE, SEPARATION MEMBRANE, AND COMPONENT SEPARATION METHOD

(75) Inventor: Kiminori Satou, Inashiki-gun (JP)

(73) Assignee: Mitsubishi Chemical Corporation, Tokyo (JP)

( * ) Notice: Subject to any disclaimer, the term of this patent is extended or adjusted under 35 U.S.C. 154(b) by 109 days.

(21) Appl. No.: 13/240,903

(22) Filed: Sep. 22, 2011

(65) Prior Publication Data

US 2012/0074065 A1    Mar. 29, 2012

Related U.S. Application Data

(63) Continuation of application No. PCT/JP2010/055001, filed on Mar. 23, 2010.

(30) Foreign Application Priority Data

Mar. 24, 2009    (JP) .................................. 2009-072825

(51) Int. Cl.
  *B01D 61/36*    (2006.01)
  *B01D 15/00*    (2006.01)
  *B01D 71/06*    (2006.01)

(52) U.S. Cl.
  USPC ........ 210/640; 210/490; 210/500.25; 55/523; 264/45.2

(58) Field of Classification Search
  CPC .. B01D 61/362; B01D 71/028; C02F 101/30; C02F 1/44
  USPC ......... 210/500.25, 490, 321.6, 640; 264/45.2; 95/45; 427/244; 502/64; 55/523
  See application file for complete search history.

(56) References Cited

U.S. PATENT DOCUMENTS

| 5,605,631 A | * | 2/1997 | Barri et al. ..................... 210/650 |
| 6,037,292 A | | 3/2000 | Lai et al. |

(Continued)

FOREIGN PATENT DOCUMENTS

| DE | 103 04 322 A1 | 11/2004 |
| EP | 0 481 660 A1 | 4/1992 |

(Continued)

OTHER PUBLICATIONS

International Search Report issued Jun. 15, 2010 in PCT/JP2010/055001 filed Mar. 23, 2010.

Gang Li et al.; "ZSM-5 zeolite membranes prepared from a clear template-free solution"; Microporous and Mesoporous Materials, 2003, vol. 60, pp. 225-235.

(Continued)

*Primary Examiner* — Ana Fortuna
(74) *Attorney, Agent, or Firm* — Oblon, Spivak, McClelland, Maier & Neustadt, L.L.P.

(57) ABSTRACT

A zeolite membrane excellent in separation performance and having an acid resistance, and a separation membrane employing the zeolite membrane are provided. A zeolite membrane comprising a layer wherein at least two different types of zeolite crystals are present in mixed state, wherein at least two types of the above at least two different types of zeolite crystals are detectable by an X-ray pattern obtained by X-ray diffraction under the conditions that (A) the output of X-ray is 1.2 kW, (B) an X-ray bulb of copper (Cu) is employed, and (C) the wavelength of X-ray is 1.54058 A. As an alternative, the zeolite membrane comprising a first layer containing zeolite crystals and a second layer containing different type of zeolite crystals from the zeolite crystals of the first layer, wherein the first layer and the second layer constitute a laminate structure, and the thickness of the laminate structure is at most 20 pm.

21 Claims, 5 Drawing Sheets

(56) References Cited

U.S. PATENT DOCUMENTS

| | | | |
|---|---|---|---|
| 6,248,682 B1* | 6/2001 | Thompson et al. | 502/4 |
| 6,472,016 B1* | 10/2002 | Soria et al. | 427/245 |
| 6,582,495 B2* | 6/2003 | Chau et al. | 95/45 |
| 6,692,640 B2* | 2/2004 | Matsukata | 210/500.25 |
| 7,179,764 B2* | 2/2007 | Basso et al. | 502/60 |
| 2003/0104925 A1 | 6/2003 | Lai et al. | |
| 2008/0160189 A1* | 7/2008 | Mitra | 427/201 |
| 2011/0170851 A1* | 7/2011 | Orf et al. | 396/421 |
| 2012/0024777 A1* | 2/2012 | Sugita et al. | 210/500.25 |
| 2012/0074065 A1* | 3/2012 | Satou | 210/653 |

FOREIGN PATENT DOCUMENTS

| | | |
|---|---|---|
| EP | 0 599 117 A1 | 6/1994 |
| JP | 2002-201020 | 7/2002 |
| JP | 2008-247702 | 10/2008 |

OTHER PUBLICATIONS

Oscar de la Iglesia et al.; "Preparation and characterization of two-layered mordenite-ZSM-5 bi-functional membranes"; Microporous and Mesoporous Materials, 2006, vol. 93, pp. 318-324.

G. Li, et al., "Separation of water-acetic acid mixtures by pervaporation using a thin mordenite membrane", Separation and Purification Technology 32, 2003, pp. 199-206.

Gang Li, et al., "The control of phase and orientation in zeolite membranes by the secondary growth method", Microporous and Mesoporous Materials 62, 2003, pp. 211-220.

Gang Li, et al., "A study on the pervaporation of water-acetic acid mixtures through ZSM-5 zeolite membranes", Journal of Membrane Science 218, 2003, pp. 185-194.

Extended European Search Report issued Jul. 3, 2013, in European Patent Application No. 10756070.8.

* cited by examiner

ZEOLITE MEMBRANE, SEPARATION MEMBRANE, AND COMPONENT SEPARATION METHOD

CROSS REFERENCE TO RELATED APPLICATION

This application is a continuation application of PCT/JP10/55001, filed on Mar. 23, 2010, and claims priority to Japanese Patent Application No. 2009-072825, filed on Mar. 24, 2009.

TECHNICAL FIELD

The present invention relates to a zeolite membrane, a separation membrane, and a component separation method. More specifically, the present invention relates to a zeolite membrane which is excellent in the performance of separating an organic component from a mixed component containing water and the organic component and excellent in resistance against water and organic acid, etc.; a separation membrane; and a component separation method.

BACKGROUND ART

Zeolite is a crystalline aluminosilicate having pores having a size of about a molecule. A membrane made of zeolite has a characteristic of selectively transmitting molecules according to the size or the shape of molecules, and accordingly, such a membrane is widely used as a molecule sieve. Particularly, an application as a separation membrane for separating e.g. water and organic solvents, is attentioned.

Zeolite includes those having various structures such as A type (LTA), Y type (FAU), mordenite (MOR), beta type (BEA), ZSM-5 (MFI) and ZSM-11 (MEL). The notations in the brackets are structure codes specified by the International Zeolite Association. Further, since the size and the shape of crystal change according to production conditions, performances of separation membranes employing such zeolites are extremely various.

In general, when a membrane made of zeolite (zeolite membrane) is employed as a separation membrane, its performance is represented by permeation flux Q (kg/m$^2$·hr) of permeation substance and separation coefficient α. Here, in a case of separating an organic material from a mixture of water and the organic material, provided that the concentrations of water and organic material before separation are $A_1$ mass % and $A_2$ mass %, respectively, and the concentrations of water and organic material in a liquid or a gas permeated through a membrane are $B_1$ mass % and $B_2$ mass %, respectively, the separation coefficient is represented by the following formula:

$$\alpha=(B_1/B_2)/(A_1/A_2)$$

As the separation coefficient α is higher, the performance of separation membrane becomes better.

For example, MOR generally has a high acid resistance, and it can be used as a separation membrane for separating an aqueous solution containing organic acid. However, as described in Non-Patent Document 1, it has a flux Q of 0.7 kg/m$^2$·hr as measured in a separation of 50 wt % acetic acid aqueous solution, and its water permeability is low. Further, also in separation of 90 wt % isopropyl alcohol aqueous solution that is not an organic acid, MOR has low fluxes Q of 0.66 kg/m$^2$·hr and 0.26 kg/m$^2$·hr as described in Non-Patent Documents 1 and 2, respectively.

Meanwhile, general performances of MFI are disclosed in Non-Patent Documents 2 to 4. For example, as described in Non-Patent Document 2, in separation of 90 wt % isopropyl alcohol aqueous solution, MFI has a flux Q of 3.1 kg/m$^2$·hr and its water permeability is higher than that of MOR. Further, as described in Non-Patent Document 3, in separation of 50 wt % acetic acid aqueous solution, MFI has a high water permeability of 3.96 kg/m$^2$·hr. However, the separation coefficient α of MFI is lower than that of MOR, and MFI has a low resistance against acid, and accordingly, there have been many problems in long term practical use of MFI.

Meanwhile, Non-Patent Document 5 discloses a zeolite membrane having a two-layer structure constituted by a single phase of MOR and a single phase of MFI formed by two-stage hydrothermal synthesis. However, such a membrane requires the two-stage hydrothermal synthesis, and requires a high temperature heating process for removing a template. Accordingly, the process becomes complicated and its separation performance is not always good. Further, this zeolite membrane is prepared for the purpose of making a layer of single phase MFI close to a substrate function as a catalyst, and the membrane is not intended to improve separation performance. For this reason, the possibility of reducing the film thickness required to achieve improvement of separation performance is extremely low from the technical viewpoint.

PRIOR ART DOCUMENTS

Non-Patent Documents

Non-Patent Document 1: Gang Li, Eiichi Kikuchi, Masahiko Matsukata, "Separation of water-acetic acid mixtures by pervaporation using a thin mordenite membrane", Separation and Purification Technology 32 (2003) p. 199-206

Non Patent Document 2: Gang Li, Eiichi Kikuchi, Masahiko Matsukata, "The control of phase and orientation in zeolite membranes by the secondary growth method", Microporous and Mesoporous Materials 62 (2003) p. 211-220

Non-Patent Document 3: Gang Li, Eiichi Kikuchi, Masahiko Matsukata, "ZMS-5 zeolite membranes prepared from a clear template-free solution", Microporous and Mesoporous Materials 60 (2003) p. 225-235

Non-Patent Document 4: Gang Li, Eiichi Kikuchi, Masahiko Matsukata, "A study on the pervaporation of wateracetic acid mixtures through ZMS-5 zeolite membranes", Journal of Membrane Science 218 (2003) p. 185-194

Non-Patent Document 5: Oscar de la Iglesia, Silvia frusta, Reyes Mallada, Miguel Menendez, Joaquin Coronas, Jesus Santamaria, "Preparation and characterization of two-layered mordenite-ZSM-5 bi-functional membranes", Microporous and Mesoporous Materials 93 (2006) p. 318-324

DISCLOSURE OF INVENTION

Technical Problem

As described above, zeolite has various structures and performances, and a zeolite separation membrane excellent in both of flux Q and separation coefficient α as separation performances, has been desired. Further, a zeolite separation membrane having a high separation performance and acid resistance in practical use has not been easily conceivable and achievable.

The present invention has been made under the circumstances, and it is an object of the present invention to provide a zeolite membrane excellent in separation performance and having water resistance and acid resistance, and to provide a separation membrane employing such a zeolite membrane. Further, another object of the present invention is to provide a component separation method which efficiently separates an organic component from a mixed component containing water and organic component, and which is applicable to a case where the organic component contains an organic acid.

Solution to Problem

The present inventor has made extensive studies and as a result, he has discovered that a high performance separation membrane having all of water resistance, acid resistance and separation performance is obtained by forming a zeolite membrane having a layer wherein at least two different types of zeolites are present in mixed state. Specifically, he has discovered that the above object is achieved by obtaining a zeolite membrane wherein zeolite crystals are relatively uniformly grown by mixing MOR and MFI.

Namely, the gist of the present invention lies in the following [1] to [12].

[1] A zeolite membrane comprising a layer wherein at least two different types of zeolite crystals are present in mixed state,
which has a separation coefficient of at least 500 as measured in pervaporation of a mixed solution containing 10 wt % of water and 90 wt % of isopropyl alcohol at a mixed solution temperature of 75° C. under atmospheric pressure after 45 minutes from start of measurement,
wherein at least two types of the above at least two different types of zeolite crystals are detectable by an X-ray pattern obtained by X-ray diffraction under the following conditions (A) to (C):
(A) the output of X-ray is 1.2 kW;
(B) an X-ray bulb of copper (Cu) is employed; and
(C) the wavelength of X-ray is 1.54058 Å.

[2] A zeolite membrane comprising a first layer containing zeolite crystals and a second layer containing different type of zeolite crystals from the zeolite crystals of the first layer, wherein the first layer and the second layer constitute a laminate structure, and the thickness of the laminate structure is at most 20 μm.

[3] The zeolite membrane according to the above [1] or [2], which has the following features in an X-ray pattern obtained by X-ray diffraction using an X-ray having a wavelength of 1.54058 Å emitted from an X-ray bulb of copper (Cu):
(i) the position of peak top (value of 2θ) is present in at least one of regions of at least 6.4° and at most 6.6°, at least 9.6° and at most 9.9°, at least 13.3° and at most 13.6°, at least 13.7° and at most 13.9° and at least 22.1° and at most 22.4°; and
(ii) the position of peak top (value of 2θ) is present in at least one of regions of at least 7.7° and at most 8.0°, at least 8.6° and less than 8.9°, at least 8.9° and at most 9.1°, at least 22.8° and less than 23.1°, at least 23.1° and at most 23.3°, at least 23.5° and less than 23.7° and at least 23.7° and at most 23.9°.

[4] A zeolite membrane wherein MOR and MFI are present in mixed state, which comprises the following layers (a) and (b) laminated in this order from a surface of the membrane towards the inside of the membrane:
(a) a layer consisting essentially of MOR; and
(b) a mixed layer containing MOR and MFI.

[5] The zeolite membrane according to the above [4], which further comprises the following layer (c); the layers (a), (b) and (c) being laminated in this order from a surface of the membrane toward the inside of the membrane:
(c) a mixed layer containing MOR, MFI and at least one of a metal, ceramics, and an organic polymer.

[6] A zeolite membrane wherein MOR and MFI are present in mixed state, which comprises the following layers (a) and (b') laminated in this order from a surface of the membrane toward the inside of the membrane to form a laminate structure, wherein the thickness of the laminate structure is at most 20 μm:
(a) a layer consisting essentially of MOR; and
(b') a layer containing MFI.

[7] The zeolite membrane according to the above [6], which further comprises the following layer (c); the layers (a), (b') and (c) being laminated in this order from a surface of the membrane toward the inside of the membrane:
(c) a mixed layer containing MOR, MFI and at least one of a metal, a ceramics, and an organic polymer.

[8] A separation membrane formed by employing the zeolite membrane as defined in any one of the above [1] to [7].

[9] The separation membrane according to the above [8], which has a permeation flux Q (kg/m$^2$·hr) and a separation coefficient α represented by the following formulae (1) and (2), respectively, as measured in pervaporation of a mixed solution containing 30 wt % of water and 70 wt % of acetic acid at a mixed solution temperature of 70° C. under atmospheric pressure after 45 minutes from start of measurement, wherein the reduction ratio of the permeation flux $Q_{375}$ as measured after 375 minutes from start of the measurement based on the permeation flux Q as measured after 45 minutes from start of the measurement, is at most 20%:

$$Q \geq 1 \quad (1)$$

$$\alpha \geq 400 \quad (2).$$

[10] A separation membrane which has a permeation flux Q (kg/m$^2$·hr) and a separation coefficient α represented by the following formulae (1) and (2), respectively, as measured in pervaporation of a mixed solution containing 30 wt % of water and 70 wt % of acetic acid at a mixed solution temperature of 70° C. under atmospheric pressure after 45 minutes from start of measurement, wherein the reduction ratio of the permeation flux $Q_{375}$ as measured after 375 minutes from start of the measurement based on the permeation flux Q as measured after 45 minutes from start of the measurement, is at most 20%:

$$Q \geq 1 \quad (1)$$

$$\alpha \geq 400 \quad (2).$$

[11] A component separation method for separating a part of an organic component from a mixed component containing water and the organic component, which employs the separation membrane as defined in any one of the above [8] to [10].

[12] The component separation method according to the above [11], wherein the organic component contains an organic acid.

Advantageous Effects of Invention

As described above, by the present invention, it is possible to provide a zeolite membrane excellent in separation performance and having water resistance and acid resistance, and to provide a separation membrane employing such a zeolite membrane. Further, it is possible to provide a component separation method which efficiently separates an organic component from a mixed component containing water and organic component, and which is applicable to a case where the organic component contains an organic acid.

DESCRIPTION OF EMBODIMENTS

Now, the present invention will be described in detail, but the present invention is not limited to the following Examples, and it can be carried out with various modifications so long as it is within the range of the gist.

[1] Zeolite Membrane

As described above, a zeolite membrane of the present invention has at least any one of the following features.

(I) A zeolite membrane comprising a layer wherein at least two different types of zeolite crystals are present in mixed state, wherein at least two types of the above at least two different types of zeolite crystals are detectable by X-ray pattern obtained by X-ray diffraction under the following conditions (A) to (C) (hereinafter, it may be referred to as "first zeolite membrane of the present invention"):

(A) the output of X-ray is 1.2 kW;
(B) an X-ray bulb of copper (Cu) is employed; and
(C) the wavelength of X-ray is 1.54058 Å.

(II) The zeolite membrane comprising a first layer containing zeolite crystals and a second layer containing different type of zeolite crystals from the zeolite crystals of the first layer, wherein the first layer and the second layer constitute a laminate structure, and the thickness of the laminate structure is at most 20 μm (hereinafter it may be referred to as "second zeolite membrane of the present invention").

Now, the zeolite membrane of the present invention will be described in more detail with reference to a case where the at least two types of different zeolite are MOR and MFI.

The present invention is not limited to a mixed membrane of MOR and MFI. However, while MOR has a high separation coefficient, MFI has a high water permeability (permeation flux), and a mixed membrane of MOR and MFI is a preferred embodiment in that these merits can be supplemented to each other.

[1-1] X-Ray Pattern from Entire Membrane Obtained by X-Ray Diffraction

The first zeolite membrane of the present invention is characterized in that at least two different types of zeolite crystals are detectable from an X-ray pattern obtained by X-ray diffraction under the conditions (A) to (C). Namely, the zeolite membrane of the present invention is characterized in that it has at least two different types of zeolite crystals in a degree detectable by X-ray diffraction. Such a zeolite membrane can make use of characteristics of at least two types of zeolite, and it can achieve a desired object.

As an example of such a zeolite membrane of the present invention, one having the following characteristics is mentioned:

(i) the position of peak top (value of 2θ) is present in at least one of regions of at least 6.4° and at most 6.6°, at least 9.6° and at most 9.9°, at least 13.3° and at most 13.6°, at least 13.7° and at most 13.9° and at least 22.1° and at most 22.4°; and (ii) the position of peak top (value of 2θ) is present at least one of regions of at least 7.7° and at most 8.0°, at least 8.6° and less than 8.9°, at least 8.9° and at most 9.1°, at least 22.8° and less than 23.1°, at least 23.1° and at most 23.3°, at least 23.5° and less than 23.7° and at least 23.7° and at most 23.9°.

The peak of (i) is derived from MOR, and the peak of (ii) is derived from MFI.

Figure 1:
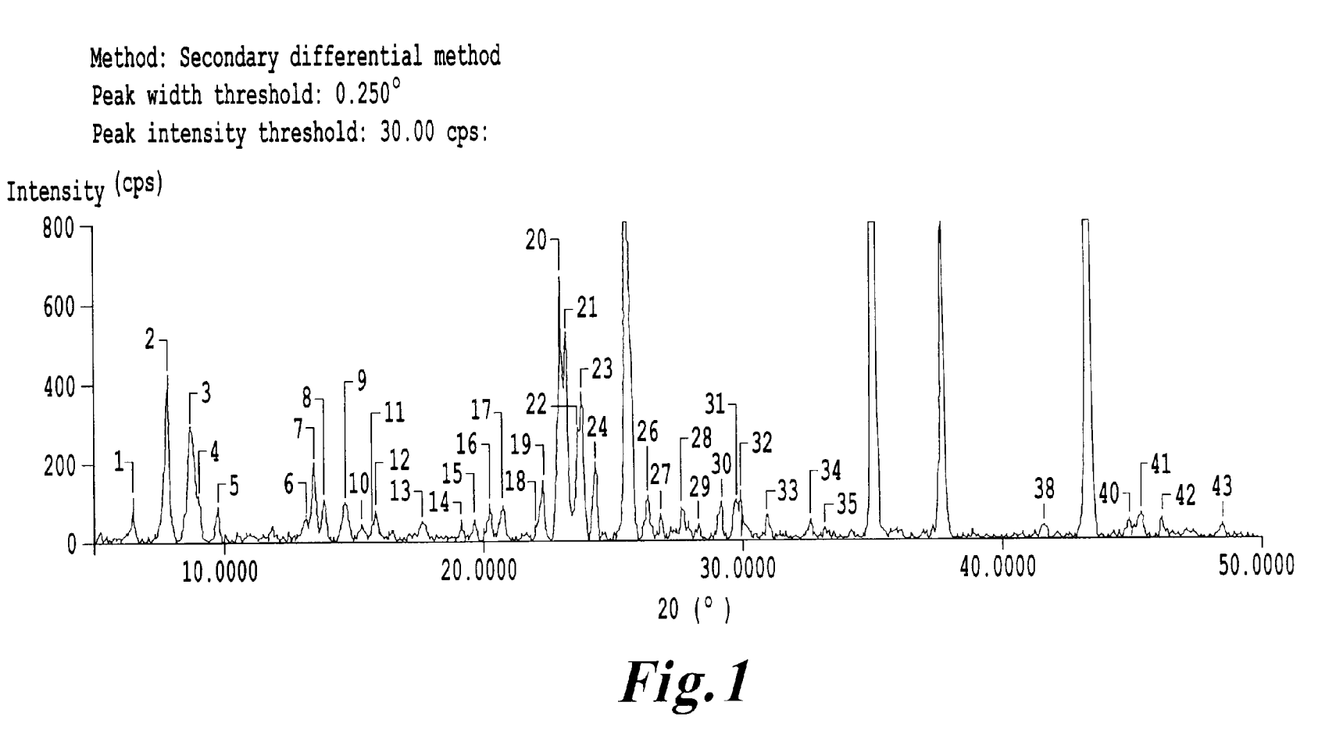
FIG. 1 is a chart showing an X-ray pattern obtained by X-ray diffraction of a zeolite membrane of the present invention.

When the inventor analyzed the zeolite membrane of the present invention by X-ray diffraction, the same pattern as one shown in FIG. 1 was obtained. Namely, in the X-ray pattern, positions of peaks (values of 2θ) were observed at positions of 6.49°, 9.74°, 13.45°, 13.84° and 22.29°, which form an X-ray pattern representing MOR crystal. Further, peaks were observed at positions of 7.86°, 8.76°, 9.02°, 22.97°, 23.20°, 23.63° and 23.80°, which from an X-ray pattern representing MFI crystal. An X-ray diffraction pattern can be measured accurately, but assuming a slight measurement error, it can be said that the above peaks are within the regions of (i) and (ii).

Here, Non-Patent Document 3 reports an example of synthesizing a zeolite membrane wherein only MFI phase is observed by X-ray diffraction, and reports that large size MOR type zeolite crystals were often observed by a scanning electron microscope. Further, Non-Patent Document 3 describes that large-sized MOR type zeolite crystals are often adhered from the outside. Namely, the zeolite membrane of Non-Patent Document 3 wherein MFI and MOR are observed at the same time, is not formed by mixed MOR and MFI grown from the inside of the membrane, and the membrane has a structure apparently different from that of the present invention. Further, in such a case, since the crystals are present as scattered large sized crystals and their amount and percentage are small, the peak of (i) is not observed in an X-ray pattern obtained by the above X-ray diffraction. Further, with the zeolite membrane of Non-Patent Document 3, it is not possible to obtain a high-performance separation membrane having both acid resistance and separation performance.

On the other hand, the zeolite membrane of the present invention is a membrane produced by mixed MOR and MFI crystals grown from not only membrane surface but also from deep inside of the membrane.

[1-2] Fine Structure of Membrane

From an observation of a surface of a zeolite membrane of the present invention by a scanning electron microscope, it is confirmed that the maximum sizes of surface crystals observed on the surface of zeolite membrane are all at most 5 μm.

Here, the maximum size means the maximum distance between optional two points on the outer shell of a crystal grain exposed from a surface of zeolite membrane when it is observed by a scanning electron microscope.

Here, Non-Patent Document 3 describes an experiment of growing crystals of mixed MOR and MFI, and describes that crystals of both types are observed by a scanning electron microscope. According to the observation, large-size MOR crystals having a maximum size of more than 5 μm are present as scattered, and there is no mordenite phase observed by X-ray diffraction, which indicates that the structure is apparently different from that of the present invention.

Next, a second zeolite membrane of the present invention is a zeolite membrane comprising a first layer containing zeolite crystals and a second layer containing different type of zeolite crystals from the zeolite crystals of the first layer, wherein the first layer and the second layer constitute a laminate structure, and the thickness of the laminate structure is at most 20 μm. The above laminate structure may have a layer other than the first layer and the second layer.

Namely, the zeolite membrane of the present invention has a characteristic that at least two different types of zeolite crystal layers form a laminate structure. Since such a zeolite membrane can make use of characteristics of at least two types of zeolites in the same manner as the above first zeolite membrane of the present invention, it is possible to achieve the desired object. Here, the laminate structure of at least two different types of zeolite crystal layers may be any one of the following embodiments:

(i) one wherein the first layer comprises a single zeolite A and the second layer comprises a single zeolite B;
(ii) one wherein the first layer comprises a single zeolite A and the second layer is a layer wherein at least two types of zeolite are present in mixed state (they may include zeolite A);
(iii) one wherein the first layer is a layer wherein at least two types of zeolite are present in mixed state (they may include zeolite A) and the second layer comprises a single zeolite A;
(iv) one wherein the first layer and the second layer are each a layer wherein at least two types of zeolite are present in mixed state and the types of the zeolite of these layers are partially or completely different; and
(v) one wherein the first layer and the second layer are each a layer wherein at least two types of zeolite are present in mixed state and these layers are the same in the types of zeolite but different in the composition ratio.

Figure 2:
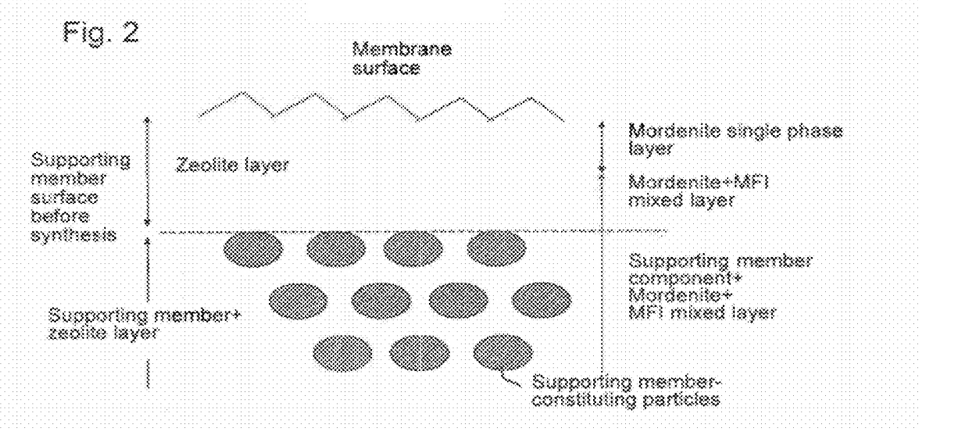
FIG. 2 is a schematic view showing a cross section of a membrane structure of the zeolite membrane of the present invention.

The zeolite membrane of the present invention is described by using one produced by the present inventor as an example. The zeolite membrane of the present invention is a membrane produced by crystallizing the mixture of MOR and MFI as a whole, but its outermost surface has a layer consisting essentially of MOR alone as shown in FIG. 2 in some cases. Here, "layer consisting essentially of MOR alone" means a single phase layer of MOR containing no MFI, but it should not be construed as a layer containing no impurity other than MOR.

With respect to the zeolite membrane of the present invention described above, the constituent phase of the membrane in the depth direction from the outermost surface of the membrane toward the deep portion of the membrane was investigated in detail by changing the incident angle of X-ray in a grazing incidence X-ray diffraction. And as a result, as shown in FIG. 3, it was confirmed that on a supporting member (such as a porous substrate of alumina) on which crystals were to be grown, a layer made of a mixed phase of MOR and MFI was grown, and a single phase layer of MOR was present as the outermost surface layer.

Figure 3:
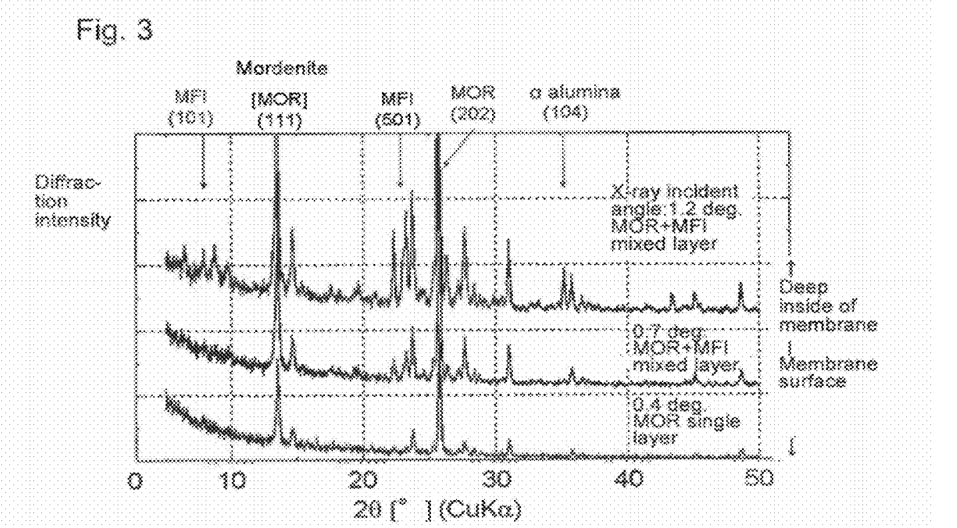
FIG. 3 is an X-ray diffraction diagram showing an information in a depth direction as grounds of the schematic diagram of FIG. 2.

Namely, the zeolite membrane of FIG. 3 has (a) a layer consisting essentially of MOR alone, (b) a mixed layer containing MOR and MFI and (c) a mixed layer containing MOR, MFI and a supporter component, that are laminated in this order from the membrane surface toward the inside of membrane.

Here, as the supporter component, a material for crystallizing the zeolite membrane of the present invention is mentioned.

The material of supporter component may be (i) a metal such as a stainless steel, sintered nickel or a mixture of sintered nickel and iron, (ii) a ceramics containing metal oxide and/or metal nitride, such as mullite, alumina, silica, titania or zirconia, or (iii) an organic polymer such as a copolymer of tetrafluoroethylene and perfluorosulfonic acid (for example, Nafion (tradename)). Among these, from the viewpoint of heat resistance and mechanical strength, alumina or a stainless steel is preferred.

Further, the total thickness of the zeolite membrane depends on the growing conditions of the membrane, and is usually at most 20 μm, preferably at most 10 μm, still more preferably at most 5 μm. The smaller the thickness of the zeolite membrane, the better, but it is usually at least 1 μm.

Further, the thickness of the single phase layer of MOR being the outermost layer is usually at least 0.2 μm, preferably at least 0.5 μm, still more preferably at least 1 μm, and it is usually at most 5 μm, preferably at most 3 μm, still more preferably at most 2 μm. If the thickness of the single phase layer of MOR being the outermost layer is too large, the permeation resistance becomes high and the permeation flux becomes low, such being not preferred.

Further, the thickness of (b) the mixed layer containing MOR and MFI or (b') the layer containing MFI, is usually at most 10 μm, preferably at most 5 μm, still more preferably at most 3 μm. From the viewpoint of lowering permeation resistance, the thickness of (b) or (b') is preferably thin, but usually at least 0.5 μm.

The reason why the zeolite membrane of the present invention has acid resistance, is considered to be because the single phase layer of MOR is present on the outermost surface of the membrane. From this viewpoint, the zeolite membrane of the present invention is preferably one having (a) a layer consisting essentially of MOR alone and (b') a layer containing MFI, but it is preferably one containing (b) a mixed layer containing MOR and MFI instead of (b'), still more preferably one containing (c) a mixed layer containing MOR, MFI and a supporter component. When the membrane contains such a mixed layer, as compared with a case where a single phase of MOR and a single phase of MFI are laminated, material characteristics transit more smoothly and continuously so as to have no discontinuous border, and the membrane as a whole is excellent in mechanical stability.

Further, the zeolite membrane of the present invention has a characteristic that it has a high separation performance in terms of permeation flux Q and separation coefficient α. Detail of the separation performance of the zeolite membrane of the present invention is the same as the characteristics of a separate membrane to be described in [2].

[2] Separation Membrane

[2-1] Characteristics

The separation membrane of the present invention has a characteristic that it has a permeation flux $Q$ (kg/m²·hr) and a separation coefficient α represented by the following formulae (1) and (2), respectively, as measured in pervaporation of a mixed solution containing 30 wt % of water and 70 wt % of acetic acid at a mixed solution temperature of 70° C. under atmospheric pressure after 45 minutes from start of measurement, wherein the reduction ratio of the permeation flux $Q_{375}$ as measured after 375 minutes from start of the measurement based on the permeation flux Q as measured after 45 minutes from start of the measurement, is at most 20%:

$$Q \geq 1 \quad (1)$$

$$\alpha \geq 400 \quad (2).$$

The performance of the separation membrane can be represented by permeation flux Q and separation coefficient α for permeation material as described above. The permeation flux Q of the separation membrane of the present invention in pervaporation of a mixed solution containing 30 wt % of water and 70 wt % of acetic acid at a mixed solution temperature of 70° C. under atmospheric pressure, is usually at least 1 kg/m²·hr, preferably at least 1.5 kg/m²·hr, still more preferably at least 1.8 kg/m²·hr.

Further, as in the above case of separating an organic material and water, that are to be separated, provided that the concentrations of water and organic material before separation are $A_1$ mass % and $A_2$ mass %, respectively, and the concentrations of water and the organic material in a liquid or a gas permeated through the membrane is $B_1$ mass % and $B_2$ mass %, respectively, the separation coefficient is represented by the following formula:

$$\alpha = (B_1/B_2)/(A_1/A_2).$$

As the separation coefficient α is larger, the performance of the separation membrane is better.

In the separation membrane of the present invention, the separation coefficient α as measured in pervaporation of a mixed solution containing 30 wt % of water and 70 wt % of acetic acid at a mixed solution temperature of 70° C. under atmospheric pressure after 45 minutes from start of measurement, is usually at least 400, preferably at least 500, more preferably at least 600, particularly preferably at least 650.

Further, in the separation membrane of the present invention, the separation coefficient α as measured in pervaporation of a mixed solution containing 10 wt % of water and 90 wt % of isopropyl alcohol at a mixed solution temperature of 75° C. under atmospheric pressure 45 minutes after start of measurement, is usually at least 500, preferably at least 700, more preferably at least 1,000, particularly preferably at least 3,000.

Further, in the separation membrane of the present invention, the reduction ratio of the permeation flux $Q_{375\ min}$ as measured after 375 minutes from start of measurement based on the permeation flux Q as measured after 45 minutes from start of measurement, is usually at most 25%, preferably at most 10%, more preferably at most 5%. Namely, since the separation membrane of the present invention has acid resistance, the membrane shows little degradation even by a long time acetic acid separation, and the permeation performance of the membrane is hard to be deteriorated. Here, the reason why the permeation flux Q as measured after 45 minutes from start of measurement is used as a base is as follows. Namely, the permeation flux right after start of measurement is numerically unstable in some cases. Thus, the permeation flux as measured after 45 minutes from start of measurement, that is numerically stable, is used as the base. In the present invention, specifically, the average value of permeation flux in 50 minutes starting after 45 minutes from start of measurement is designated as Q, and the average value of permeation flux in 50 minutes starting after 375 minutes from start of measurement, is designated as $Q_{375\ min}$. The time of start of measurement is usually the time of operation of a pervaporation apparatus for evaluating the performance of separation membrane, which substantially represents a time when the separation membrane starts to separate the mixed component (mixed solution containing 30 wt % of water and 70 wt % of acetic acid) containing water and organic component.

As the above separation membrane of the present invention, one formed by employing the zeolite membrane of the present invention is mentioned. Now, an example of production process of the separation membrane of the present invention will be described in detail.

[2-2] Production Process

The separation membrane of the present invention is usually obtained by making zeolite crystals adhere to (be supported by) a surface of a porous substrate and carrying out hydrothermal synthesis. Now, each step is described in detail.

[2-2-1] Adhesion of Seed Crystals to Porous Substrate

Before synthesizing reaction of zeolite, seed crystals of zeolite are made adhere to a surface layer (underlayer) of a porous substrate. The average diameter dsm of seed crystals of zeolite and the average pore diameter dtm of the underlayer preferably satisfy a relation $1/3 \leq dtm/dsm \leq 6$, more preferably satisfy a relation $1 \leq dtm/dsm \leq 4$. For example, when the average diameter dsm of seed crystals is 0.3 μm and the average pore diameter dtm of the underlayer is 0.6 μm, dtm/dsm becomes 2 and the above relation is satisfied. The reason why the above relation is preferably satisfied is because the final thickness of a zeolite membrane to be formed is determined by a relation between the average pore diameter dtm of the underlayer and the average diameter dsm of zeolite seed crystals. If dtm/dsm is smaller than 1/3, sufficiently continuously crystallized zeolite membrane cannot be obtained and generation of pinholes in the zeolite membrane increases to decrease the separation performance. Further, if dtm/dsm is larger than 6, the amount of zeolite seed crystals adhered to the underlayer excessively increases, and as a result, in e.g. a drying step after dipping, cracks are formed in the seed crystals to deteriorate separation performance of a filter member after formation of zeolite membrane.

(1) Seed Crystals

Fine particles of zeolite are put in water, mixed and stirred to form a slurry. At a time of obtaining a zeolite membrane of the present invention, it is preferred to appropriately adjust the composition, the shape and the size of the seed crystals. As the zeolite, for example, MFI type zeolite crystals or a mixture of MOR type zeolite crystals and MFI type zeolite crystals may be employed, and such a material is pulverized into a particle size of usually at most 5 μm, preferably at most 1 μm by e.g. a wet type pulverization method.

The concentration of the seed crystals contained in the slurry is usually at least 0.1 wt %, preferably at least 0.5 wt %, and usually at most 5 wt %, preferably at most 1.5 wt %.

For example, the average diameter dsm of the fine particles (seed crystals) of zeolite is preferably 0.3 μm, and the concentration of the seed crystals contained in the slurry is preferably 0.5 wt %.

(2) Porous Substrate

As the porous substrate, various types of substrates that are usually to be employed for zeolite membrane, may be employed.

The shape of the porous substrate is not particularly limited, ones having various shapes such as a tubular shape, a flat-plate shape, a honeycomb shape, a hollow string shape or a pellet shape, may be employed. For example, in a case of tubular shape, the size of the porous substrate is not particularly limited, and it is practically about from 2 to 200 cm in the length, from 0.5 to 2 cm in the inner diameter, and from 0.5 to 4 mm in the thickness.

Further, the porous substrate may be one comprising a single layer (so-called symmetric membrane) or a porous substrate of two-layer structure (so-called asymmetric membrane) comprising a substrate layer and an underlayer. Further, a porous substrate having a structure of at least three layers may be employed.

As the material, usually, ceramics, an organic polymer or a metal is preferred, and the material is more preferably ceramics. As the ceramics, mullite, alumina, silica, titania, zirconia, etc. is preferred. As the organic polymer, a copolymer of tetrafluoroethylene and perfluorosulfonic acid (for example, Nafion (tradename)), etc. is preferred.

As the metal, a stainless steel, a sintered nickel or a mixture of sintered nickel and iron is preferred.

(3) Adhesion of Seed Crystals

The porous substrate is dipped in a slurry containing seed crystals of zeolite. Here, in order to make the slurry adhere to the porous substrate, a method such as a dip-coating method, a spray-coating method, a painting method, a filtering method, etc. is appropriately selected according to the shape of the porous substrate. The contact time of the porous substrate with the slurry is preferably from 0.5 to 60 minutes, more preferably from 1 to 10 minutes.

As an example of obtaining a mixture of MOR type zeolite crystals and MFI type zeolite crystals, the following method is mentioned. Namely, a seed crystal slurry having a seed crystal concentration of 1% is prepared, and a cylindrical tubular-shaped supporting member is vertically dipped into the seed crystal slurry. The dipping time is set to be about 3 minutes. After the dipping, the cylindrical tubular-shaped supporting member is vertically lifted. The lifting speed is set to be about 0.3 cm/sec.

The amount of seed crystals adhered by such a method is preferably a small amount so that the adhered seed crystals does not form a layer.

After adhesion of the seed crystals, the porous substrate is preferably dried. Drying at a high temperature is not preferred since evaporation of solvent is quick and agglomeration of the seed crystal particles increases to deteriorate a uniform seed crystal adhesion state. Accordingly, the drying is preferably carried out at a temperature of at most 70° C. In order to shorten the heating time, it is preferred to carry out room temperature drying and hot drying in combination. The drying is preferably carried out until the porous substrate is sufficiently dried. The drying time is not particularly limited, and it is usually about from 2 to 24 hours.

As an example of obtaining a mixture of MOR type zeolite crystals and MFI type zeolite crystals, the following method is mentioned. Namely, the porous supporting member having a surface to which the seed crystals are adhered and supported, is disposed vertically in a dryer. The dryer is operated at a temperature setting of about 36° C. for 12 to 18 hours.

[2-2-2] Synthesis Reaction of Zeolite

Synthesis of a zeolite membrane on the porous substrate can be made by a hydrothermal synthesis method, a gas-phase method, etc. In the following, using a hydrothermal synthesis method as an example, a synthesis method of a zeolite membrane will be explained, but the present invention is not limited to this method.

(1) Raw Material

A material for hydrothermal reaction is put into water and stirred to prepare a reaction solution or a slurry to be used for zeolite synthesis reaction. The material is an alumina source and a silica source, and as the case requires, an alkali metal source and/or an alkali earth metal source. As the alumina source, an aluminum salt such as aluminum hydroxide, sodium aluminate, aluminum sulfate, aluminum nitrate or aluminum chloride, an alumina powder, a colloidal alumina, etc. is mentioned. As the silica source, an alkali metal silicate such as sodium silicate, a liquid glass or potassium silicate, a silica powder, a silicic acid, colloidal silica, silicon alkoxide (aluminum isopropoxide, etc.) etc. is mentioned. As the alkali (earth) metal source, sodium chloride, potassium chloride, calcium chloride, magnesium chloride, etc. is mentioned. The alkali metal silicate may be used as both silica source and alkali metal source.

The molar ratio between silica source and alumina source (converted to $SiO_2/Al_2O_3$) is appropriately determined according to the objective composition of zeolite. In the present invention, when MFI type zeolite crystals and MOR type zeolite crystals are employed, the composition is adjusted so that they are formed in mixed state with MOR type zeolite and MFI type zeolite, respectively.

A crystallization-promoting agent of zeolite may be added to the reaction solution or the slurry. As the crystallization-promoting agent, tetrapropylammonium bromide or tetrabutylammonium bromide, etc. may be mentioned.

(2) Hydrothermal Synthesis Treatment

To the porous substrate to which seed crystals are adhered, the reaction solution or the slurry is brought into contact (for example, the porous substrate is immersed in the reaction solution or the slurry) to carry out hydrothermal synthesis treatment. The reaction temperature (temperature of the reaction solution or the slurry) is usually at least 40° C., preferably at least 80° C., and usually at most 200° C., preferably at most 150° C. If the reaction temperature is too low, the synthesis reaction of zeolite does not sufficiently occur. Further, if the temperature is too high, it is difficult to control the synthesis reaction of zeolite, and a uniform zeolite membrane cannot be obtained. The reaction time may be appropriately changed according to the reaction temperature, and in general, it may be from 1 to 100 hours. Here, in a case of maintaining a water base reaction solution or slurry to a temperature higher than 100° C., the reaction may be carried out in an autoclave. Here, in the present invention, as described above, the composition of the raw material is adjusted so that MOR type zeolite and MFI type zeolite are formed in mixed state, and by carrying out hydrothermal synthesis treatment once, the zeolite membrane of the present invention can be synthesized.

[2] Component Separation Method

The component separation method of the present invention has a characteristic that a part of the organic component is separated from a mixed component containing water and organic component by using the above separation membrane.

The organic component may be a liquid such as an alcohol or an organic acid, but in the present invention, from the viewpoint of acid resistance, the method has a characteristic that it can be suitably employed for separation of organic acid. As the alcohol, methyl alcohol, ethyl alcohol, propyl alcohol, isopropyl alcohol, butyl alcohol, isobutyl alcohol, s-butyl alcohol or t-butyl alcohol may, for example, be mentioned. As the organic acid, acetic acid or acrylic acid may, for example, be mentioned. Further, as other organic components, hexane or toluene may, for example, be mentioned.

EXAMPLES

Now, the present invention will be more specifically described with reference to Examples, but these Examples are used for the purpose of explaining the present invention, and the present invention is not limited to these embodiments.

[1] Preparation of Sample

[1-1] Preparation of Zeolite Membrane A

On a surface of a porous alumina supporting tube (porous substrate) having a length of 10 cm and an outer diameter of 1.2 cm (inner diameter of 0.9 cm), MFI type zeolite crystals were supported. As these seed crystals, MFI type zeolite crystals ($SiO_2/Al_2O_3$ (mol/mol)=32) manufactured by Zeolyst International that were pulverized into a size of at most 1 μm by a wet ball mill, were employed. The seed crystals were immersed in 1 wt % slurry solution for 3 minutes. In the solution, the supporting tube was immersed for 3 minutes. Thereafter, it was vertically lifted at a speed of 3 mm/sec. The tube was disposed for 14 hours in a dryer set to be 36° C.

After supporting of the crystals, hydrothermal synthesis was carried out at 180° C. for 10 hours to form a zeolite membrane. In the hydrothermal synthesis, $10Na_2O:0.15Al_2O_3:36SiO_2:960H_2O$ was employed as a reaction solution.

With respect to the zeolite membrane A obtained, an X-ray diffraction pattern measurement was carried out by using an X-ray bulb of copper (Cu) with an X-ray wavelength of 1.54058 Å at a X-ray power of 1.2 kW, and the result is shown in FIG. 1.

Namely, the positions of peaks (values of 2θ) were observed at positions of 6.49°, 9.74°, 13.45°, 13.84° and 22.29°, which form an X-ray pattern representing MOR crystal. Further, the peaks were observed at positions of 7.86°, 8.76°, 9.02°, 22.97°, 23.20°, 23.63 and 23.80°, which form an x-ray pattern representing MFI crystal.

Figure 4:
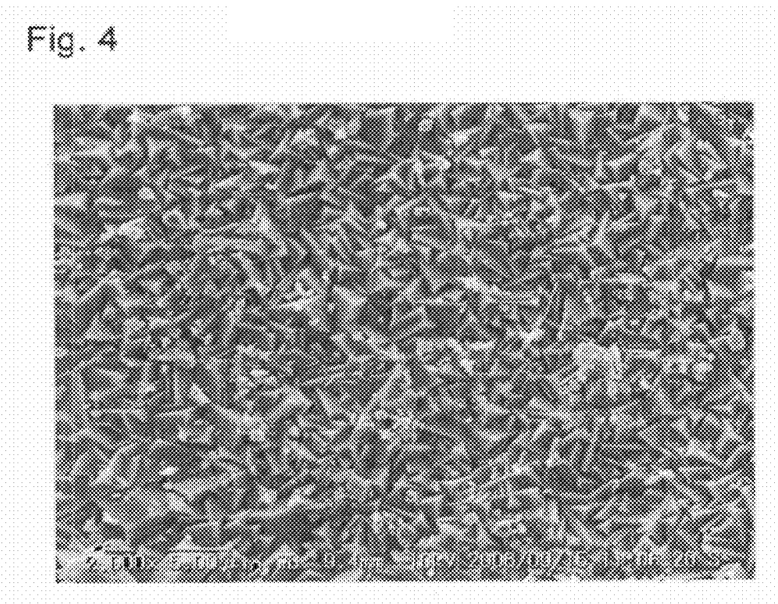
FIG. 4 is a photograph of a surface of the zeolite membrane of the present invention observed by a scanning electron microscope.

Further, the membrane was observed by a scanning electron microscope. FIG. 4 shows the results. It was confirmed that the maximum size of zeolite crystals on a surface of zeolite membrane A was at most 5 μm.

Further, with respect to zeolite membrane A, the constituent phase of the membrane along the depth direction from the outermost surface of the membrane toward deep inside the membrane was studied in detail by changing X-ray incident angle in grazing incidence X-ray diffraction method. As a result, as shown in FIG. 3, it was confirmed that on an alumina porous substrate on which crystals were grown, a layer made of a mixed phase of MOR and MFI was grown, and further, a single phase layer of MOR was present as the outermost layer.

[1-2] Preparation of Zeolite Membrane C

A zeolite membrane C was obtained by the same method as that of zeolite membrane A except that $10Na_2O:0.37Al_2O_3:36SiO_2:1720H_2O$ was employed as the reaction solution of hydrothermal synthesis.

The obtained zeolite membrane C was analyzed by X-ray diffraction pattern under the same conditions as those of the above, and as a result, and it was confirmed that the membrane was made of a mixed phase of MFI and MOR.

[1-3] Preparation of Zeolite Membrane B

On a surface of a porous alumina supporting tube having a length of 10 cm and an outer diameter of 1.2 cm (inner diameter of 0.9 cm), seed crystals of MOR type zeolite were supported. The supporting tube was immersed for 3 minutes in a slurry solution containing 1 wt % of MOR type zeolite crystals ($SiO_2/Al_2O_3$ (mol/mol)=18) manufactured by Tosoh Corporation pulverized into a size of at most 1 μm. In the solution, the supporting tube was immersed for 3 minutes. Thereafter, the supporting tube on which the seed crystals were supported was lifted vertically at a speed of 0.3 cm/sec. The tube was disposed vertically in a dryer inside of which is set to be 36° C. for 14 hours.

After supporting of crystals, hydrothermal synthesis was carried out at 180° C. for 7 hours to form a zeolite membrane. In the hydrothermal synthesis, as a reaction solution, $10Na_2O:0.15Al_2O_3:36SiO_2:960H_2O$ was employed.

Figure 5:
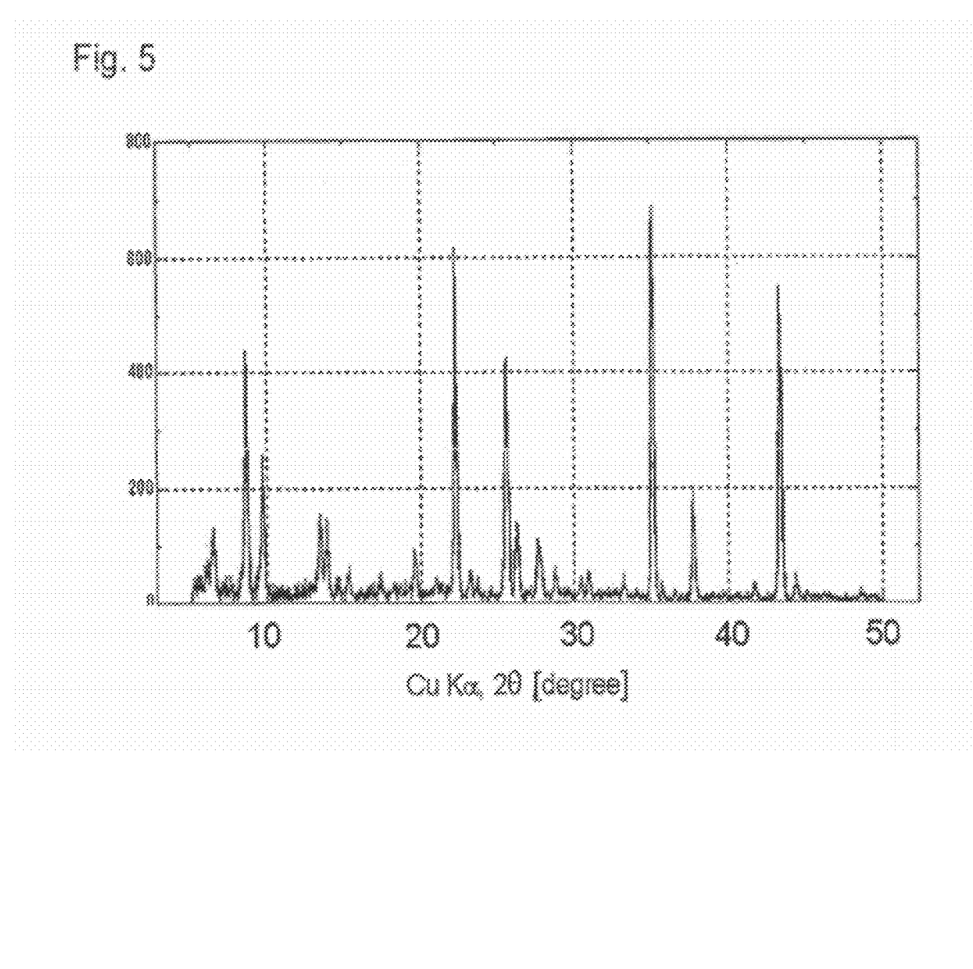
FIG. 5 is a chart showing an X-ray pattern obtained by an X-ray diffraction of a MOR type zeolite membrane.

With respect to the obtained zeolite membrane B, an X-ray diffraction pattern was obtained by using an X-ray bulb of copper (Cu) with an X-ray wavelength of 1.54058 Å at an X-ray power of 1.2 kW, and a result, it was one shown in FIG. 5.

Namely, positions of peaks (values of 2θ) were observed at positions forming an X-ray pattern representing MOR crystal. An X-ray pattern representing MFI crystal was not observed.

[2] Separation of Water and Organic Component (Alcohol) (Example 1-1)

[2-1] Separation Performances of Zeolite Membranes A and C

Figure 6:
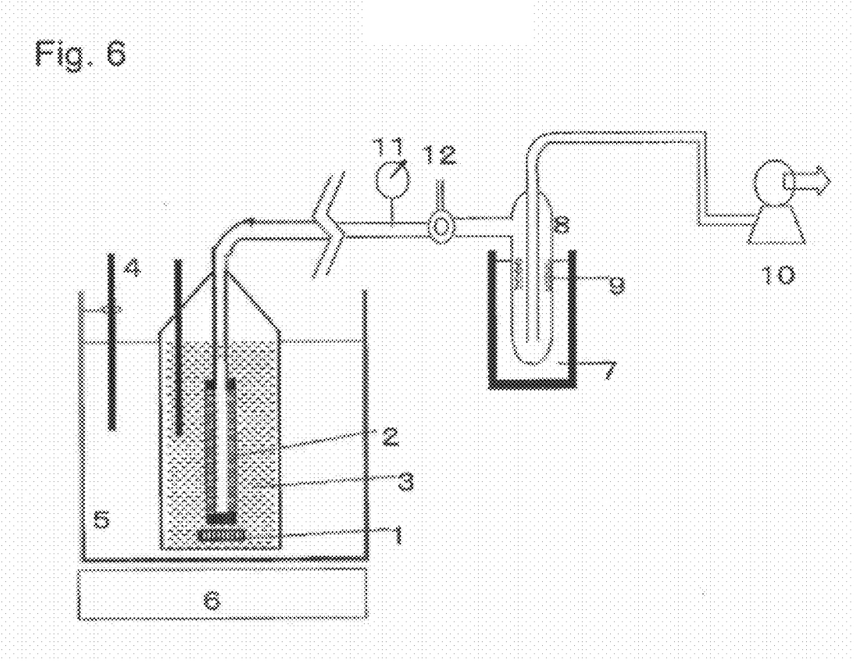
FIG. 6 is a schematic view showing a batch type pervaporation apparatus for evaluating permeation performance of the separation membrane of the present invention.

Using the above zeolite membranes A and C, a mixed solution containing 90 wt % of isopropyl alcohol and 10 wt % of water was separated under a temperature condition of 75° C. Namely, in order to evaluate the permeation performance of the separation membrane, a batch type pervaporation apparatus shown in FIG. 6 was employed. In the apparatus, a zeolite membrane 2 was immersed in a supply mixed solution 3 in a glass flask, one end of the zeolite membrane 2 was sealed by a metal and a polymer tube, and the other open end was connected to a tube 12 of vacuum line. A glass flask filled with the supply mixed solution 3 was put in a water bath having a heat media 5 of 75° C., and the supply mixed solution 3 was stirred by an agitator 1 and a stirrer 6 and maintained so that the solution temperature was 75° C. The permeated material separated from the supply mixture and permeated through the membrane was cooled and solidified by a trap 8 cooled by a liquid nitrogen 7, to be trapped (9 of FIG. 6). The permeated material cooled, solidified and captured was thawed, and its weight and chemical composition were measured to obtain a permeation flux Q and a separation coefficient α. Here, for the measurement of chemical composition, a gas chromatograph "GC-14B" manufactured by Shimadzu Corporation was employed.

The permeation fluxes Q of zeolite membranes A and B 45 minutes after start of the measurement were 4.6 kg/m²·hr and 4.4 kg/m²·hr, respectively. Further, the separation coefficients α of zeolite membranes A and C were 5,200 and 4,300, respectively. These performances are extremely high as compared with those of conventional MOR and MFI.

[2-2] Reaction Conditions and Separation Performance of Zeolite Membrane (Example 1-2)

Synthesis was carried out under the same conditions as those of zeolite membrane A except for reaction solution composition and temperature. As the reaction solution, $10Na_2O:0.56Al_2O_3:36SiO_2:1720H_2O$ was employed. Six types of zeolite membranes were obtained by changing the synthesis time from 6 hours to 11 hours at 1 hour interval.

With respect to the obtained zeolite membrane, an X-ray diffraction pattern was obtained under the same conditions as those of the above, and as a result, a membrane of a mixed phase of MFI and MOR was confirmed.

In order to evaluate membrane performances of six samples obtained, permeation performance test of the membranes was carried out by using a batch type pervaporation by using a supply mixed solution containing 90 wt % of isopropyl alcohol and 10 wt % of water. Table 1 shows the results.

TABLE 1

| Synthesis time hours | Permeation flux Q kg/m²h | Separation coefficient α |
|---|---|---|
| 6 | 3.6 | 790 |
| 7 | 4 | 1500 |
| 8 | 4.1 | 1700 |
| 9 | 3.7 | 3400 |
| 10 | 2.8 | 3100 |
| 11 | 2.4 | 3100 |

According to the results shown in Table 1, these zeolite membranes showed higher permeation fluxes than those of conventional MOR. Further, they showed extremely high permeation separation performances as compared with conventional MFI.

[3] Separation of Water and Organic Component (Organic Acid)(Examples 2 to 5, Comparative Examples 1 to 6)

By the above zeolite membrane A, a mixed solution containing 50 wt % of acetic acid and 50 wt % of water was separated under a temperature condition of 80° C.

In 40 minutes of permeation time, 8.34 g of permeated material permeated through the zeolite membrane was captured. Its chemical composition was such that water was 99.58 wt % and acetic acid was 0.42 wt %. From these measurement data, the permeation flux Q was determined to be 3.3 (kg/m$^2$·hr) and the separation coefficient α was determined to be 240.

Here, the measurement in this 40 minutes of permeation time was started 195 minutes after start of the permeation test. Prior to this measurement, six times of measurements were carried out for 20 minutes, 40 minutes, 40 minutes, 55 minutes, 40 minutes and 40 minutes, respectively, after 20 minutes, 60 minutes, 100 minutes, 155 minutes, 195 minutes and 235 minutes, respectively from start of the test. The results of these six times of measurements having a total time of 235 minutes indicate that the membrane performance was stable and the measurement value was sufficiently stabilized after 20 minutes from start of the test. Namely, the permeation fluxes Q and the separation coefficients α of the second to sixth measurements were within a variation range of 10%.

By the same process, using the zeolite membranes A and B, under temperature conditions of 70° C. and 80° C., a mixed solution containing 50 wt % of acetic acid and 50 wt % of water, a mixed solution containing 70 wt % of acetic acid and 30 wt % of water and a mixed solution containing 90 wt % of acetic acid and 10 wt % of water, were separated. Table 2 shows the results.

brane of the present invention showed relatively high permeation flux Q.

Here, a zeolite membrane comprising MFI type alone has a separation coefficient α of from 8 to 24 as described in Non-Patent Document 4. Accordingly, it was confirmed that the separation coefficient of the zeolite membrane of the present invention was extremely high as compared with a conventional zeolite membrane comprising MFI type alone.

[4] Membrane Permeation Separation Performance of Zeolite Membrane A Under High Temperature High Pressure Conditions (Example 6)

Membrane permeation separation performance of the zeolite membrane A under high temperature high pressure conditions being the conditions of actual industrial process, was measured by pervaporation. As a supply solution, a mixed solution containing 50 wt % of isopropanol and 50 wt % of water was employed. While the temperature condition was changed from 90° C. to 130° C., the permeation separation performance was measured. As a result, the permeation flux Q increased from 5.1 kg/m$^2$·hr at 90° C. to 14.1 kg/m$^2$·hr at 130° C. Table 3 shows permeation flux Q and separation coefficient α at each temperature. The separation coefficient changed from 270 to 330. Leakage of isopropanol in the permeation solution was at most 0.4 wt %. This performance is sufficient for practical use in separation process.

TABLE 3

| Temperature (° C.) | Permeation flux Q | Separation coefficient α | Total pressure kPa |
|---|---|---|---|
| 90 | 5.1 | 290 | 143.6 |
| 100 | 7 | 320 | 200.5 |
| 110 | 8.7 | 330 | 289.2 |
| 120 | 10.8 | 310 | 402.3 |
| 130 | 14.1 | 270 | 547.7 |

TABLE 2

| | Zeolite membrane | Solution temp. (° C.) | Acetic acid concentration (wt %) | Initial permeation flux $Q_{initial}$ | Measurement time from start (min) | Permeation flux after lapse of time $Q_{lapse}$ | Measurement time from start (min) | Reduction ratio of permeation flux (%) | Acetic acid concentration after separation (%) | Initial separation coefficient $α_{initial}$ | Separation coefficient after lapse of time $α_{lapse}$ |
|---|---|---|---|---|---|---|---|---|---|---|---|
| Ex. 2 | A | 70 | 70 | 1.86 | 45-95 | 1.8 | 375-425 | 3.3 | 0.35 | 670 | 560 |
| Ex. 3 | A | 70 | 95 | 0.04 | 45-70 | 0.04 | 235-465 | 0.0 | 7.44 | 230 | 210 |
| Ex. 4 | A | 80 | 90 | 0.89 | 45-90 | 0.85 | 340-385 | 4.7 | 1.36 | 650 | 740 |
| Ex. 5 | A | 80 | 95 | 0.16 | 45-90 | 0.13 | 340-400 | 23.1 | 5.27 | 340 | 250 |
| Comp. Ex. 1 | B | 70 | 50 | 0.49 | 45-90 | 1.06 | 340-400 | −46 | 0.1 | 420 | 1000 |
| Comp. Ex. 2 | B | 70 | 70 | 0.66 | 45-90 | 0.64 | 300-345 | 3.1 | 0.25 | 900 | 1000 |
| Comp. Ex. 3 | B | 70 | 90 | 0.19 | 45-105 | 0.09 | 325-375 | 111 | 0.66 | 3200 | 1300 |
| Comp. Ex. 4 | B | 80 | 50 | 1.74 | 45-90 | 1.66 | 350-395 | 4.8 | 0.14 | 500 | 710 |
| Comp. Ex. 5 | B | 80 | 70 | 1.15 | 45-90 | 1.16 | 335-380 | −0.8 | 0.17 | 900 | 1300 |
| Comp. Ex. 6 | B | 80 | 90 | 0.21 | 45-90 | 0.15 | 345-405 | 40 | 0.6 | 2600 | 1500 |

According to Table 2, the zeolite membrane of the present invention showed higher permeation flux Q than that of MOR type. Namely, from the comparison of Example 2 and Comparative Example 2 or Example 4 and Comparative Example 6, that are the same in acetic acid concentration and temperature of mixed solution, it was confirmed that the zeolite mem- Further, deterioration of performance of zeolite membrane A was not recognized during the test. On the other hand, commercially available A type zeolite membranes tend to be deteriorated in the dehydration process under high water content condition such as the above test condition wherein the water content is 50 wt %. Namely, it can be said that the zeolite membrane of the present invention is extremely excellent in water resistance as compared with conventional zeolite membranes.

Industrial Applicability

It was confirmed that the zeolite membrane of the present invention is excellent in all of water resistance, acid resistance and separation coefficient as compared with conventional zeolite membranes, and that the zeolite membrane has high utility value and it has extremely high industrial applicability.

The entire disclosure of Japanese Patent Application No. 2009-072825 filed on Mar. 24, 2009 including specification, claims, drawings and summary is incorporated herein by reference in its entirety.

| REFERENCE SYMBOLS | |
|---|---|
| 1: | agitator |
| 2: | zeolite membrane |
| 3: | supply mixed solution |
| 4: | thermometer |
| 5: | hot medium |
| 6: | stirrer |
| 7: | liquid nitrogen |
| 8: | trap |
| 9: | trapped permeation material |
| 10: | vacuum pump |
| 11: | vacuum meter |
| 20: | leakage valve |

What is claimed is:

1. A zeolite membrane, comprising:
a layer that comprises at least two different types of zeolite crystals in mixed state,
wherein the zeolite membrane has a separation coefficient of at least 500 as measured in pervaporation of a mixed solution containing 10 wt % of water and 90 wt % of isopropyl alcohol at a mixed solution temperature of 75° C. under atmospheric pressure after 45 minutes from start of measurement,
at least two types of the at least two different types of zeolite crystals are detectable by an X-ray pattern obtained by X-ray diffraction,
an output of an X-ray in the X-ray diffraction is 1.2 kW, the X-ray diffraction is with an X-ray bulb of copper, and a wavelength of the X-ray is 1.54058 Å.

2. The zeolite membrane according to claim 1,
wherein, in an X-ray pattern obtained by X-ray diffraction of the zeolite membrane with an X-ray having a wavelength of 1.54058 Å emitted from an X-ray bulb of copper (Cu):
the position of peak top (value of 2θ) in at least one of regions of at least 6.4° and at most 6.6°, at least 9.6° and at most 9.9°, at least 13.3° and at most 13.6°, at least 13.7° and at most 13.9° and at least 22.1° and at most 22.4°; and
the position of peak top (value of 2θ) in at least one of regions of at least 7.7° and at most 8.0°, at least 8.6° and less than 8.9°, at least 8.9° and at most 9.1°, at least 22.8° and less than 23.1°, at least 23.1° and at most 23.3°, at least 23.5° and less than 23.7° and at least 23.7° and at most 23.9°.

3. The zeolite membrane as defined in claim 1, wherein the membrane is suitable for separation of mixed components comprising water and organic components.

4. The separation membrane according to claim 3, wherein the separation membrane has a permeation flux Q (kg/m²·hr) and a separation coefficient α of formulae (1) and (2), respectively, as measured in pervaporation of a mixed solution containing 30 wt % of water and 70 wt % of acetic acid at a mixed solution temperature of 70° C. under atmospheric pressure after 45 minutes from start of measurement, wherein a reduction ratio of permeation flux $Q_{375}$ as measured after 375 minutes from start of the measurement based on permeation flux Q as measured after 45 minutes from start of the measurement, is at most 20%:

$$Q \geq 1 \tag{1}$$

$$\alpha \geq 400 \tag{2}$$

5. A component separation method, comprising:
separating a part of an organic component from a mixed component comprising water and the organic component with the zeolite separation membrane of claim 3.

6. The component separation method according to claim 5, wherein the organic component comprises an organic acid.

7. A zeolite membrane, comprising layers laminated in this order from a surface of the membrane towards an inside of the membrane:
(a) a layer consisting essentially of MOR; and
(b) a mixed layer comprising MOR and MFI, wherein MOR and MFI are present in mixed state.

8. The zeolite membrane according to claim 7, further comprising:
a mixed layer (c) comprising MOR, MFI, and at least one third component selected from the group consisting of a metal, a ceramic, and an organic polymer, laminated after the mixed layer (b), from a surface of the membrane toward an inside of the membrane.

9. The zeolite membrane as defined in claim 7, wherein the membrane is suitable for separation of mixed components comprising water and organic components.

10. The separation membrane according to claim 9, wherein the separation membrane has a permeation flux Q (kg/m²·hr) and a separation coefficient α of formulae (1) and (2), respectively, as measured in pervaporation of a mixed solution containing 30 wt % of water and 70 wt % of acetic acid at a mixed solution temperature of 70° C. under atmospheric pressure after 45 minutes from start of measurement, wherein a reduction ratio of permeation flux $Q_{375}$ as measured after 375 minutes from start of the measurement based on permeation flux Q as measured after 45 minutes from start of the measurement, is at most 20%:

$$Q \geq 1 \tag{1}$$

$$\alpha \geq 400 \tag{2}$$

11. A component separation method, comprising:
separating a part of an organic component from a mixed component comprising water and the organic component with the zeolite separation membrane of claim 9.

12. The component separation method according to claim 11, wherein the organic component comprises an organic acid.

13. A zeolite membrane, comprising, in this order, from a surface of the membrane toward an inside of the membrane:
(a) a layer consisting essentially of MOR; and
(b') a layer comprising MFI;
wherein the layer (b') further comprises MOR mixed with the MFI, wherein the zeolite membrane further comprises a layer comprising a mixture of MOR and MFI, or both; and
wherein a thickness of the laminate structure is at most 20 μm.

14. The zeolite membrane according to claim 13, further comprising:
a mixed layer (c) comprising MOR, MFI and at least one component selected from the group consisting of a metal, a ceramic, and an organic polymer, laminated after the layer (b') from a surface of the membrane toward the inside of the membrane.

15. The zeolite membrane as defined in claim 13, wherein the membrane is suitable for separation of mixed components comprising water and organic components.

16. The separation membrane according to claim 15, wherein the separation membrane has a permeation flux Q (kg/m$^2$·hr) and a separation coefficient α of formulae (1) and (2), respectively, as measured in pervaporation of a mixed solution containing 30 wt % of water and 70 wt % of acetic acid at a mixed solution temperature of 70° C. under atmospheric pressure after 45 minutes from start of measurement, wherein a reduction ratio of permeation flux $Q_{375}$ as measured after 375 minutes from start of the measurement based on permeation flux Q as measured after 45 minutes from start of the measurement, is at most 20%:

$$Q \geq 1 \quad (1)$$

$$\alpha \geq 400 \quad (2).$$

17. A component separation method, comprising:
separating a part of an organic component from a mixed component comprising water and the organic component with the zeolite separation membrane of claim 15.

18. The component separation method according to claim 17, wherein the organic component comprises an organic acid.

19. A separation membrane which has a permeation flux Q (kg/m$^2$·hr) and a separation coefficient α of formulae (1) and (2), respectively, as measured in pervaporation of a mixed solution containing 30 wt % of water and 70 wt % of acetic acid at a mixed solution temperature of 70° C. under atmospheric pressure after 45 minutes from start of measurement,
wherein a reduction ratio of permeation flux $Q_{375}$ as measured after 375 minutes from start of the measurement based on permeation flux Q as measured after 45 minutes from start of the measurement, is at most 20%:

$$Q \geq 1 \quad (1)$$

$$\alpha \geq 400 \quad (2),$$

wherein a thickness of the separation membrane is at most 20 μm, and
wherein the separation membrane comprises at least two types of zeolite crystals in a mixed state.

20. A component separation method, comprising:
separating a part of an organic component from a mixed component comprising water and the organic component with the zeolite separation membrane of claim 19.

21. The component separation method according to claim 20, wherein the organic component comprises an organic acid.

* * * * *